Patented Mar. 22, 1932

1,850,316

UNITED STATES PATENT OFFICE

CLARK W. DAVIS, OF SWARTHMORE, PENNSYLVANIA, ASSIGNOR TO E. I. DU PONT DE NEMOURS & COMPANY, OF WILMINGTON, DELAWARE, A CORPORATION OF DELAWARE

CATALYST

No Drawing. Original application filed February 18, 1928, Serial No. 255,503. Patent No. 1,706,055. Divided and this application filed March 14, 1929. Serial No. 347,194.

This invention relates to a process for oxidizing ammonia to form oxides of nitrogen and more particularly it relates to an improved catalyst for carrying out such processes.

This application is a division of my copending application which has terminated in Patent 1,706,055.

It has been known for many years that when a mixture of ammonia and air is brought into contact with a catalyst such as platinum, at a red heat, the ammonia is oxidized forming oxides of nitrogen, water and nitrogen. Platinum, as a catalyst for this reaction, was discovered in 1839 by Kuhlmann. This metal has been used for a catalyst during the existence of this process in a specially refined state. Landis investigated the effect of various impurities in platinum on the conversion of ammonia and found iridium to be deleterious. This work led to his patent U. S. 1,193,799, which claims the use of iridium free platinum. The analyses of the platinum gauzes used at Muscle Shoals nitrate plant are given by Perley, J. Ind. Eng. Chem. vol. 12 (1920) page 10. The impurities shown vary from .05% to 1.08%, which it is believed must be taken into consideration as impurities which are likely to occur in platinum. To secure high efficiency of conversion, it is necessary to maintain the contact agent at temperatures in excess of 700° C. At temperatures above 850° C. the loss of platinum becomes more rapid but still the higher the temperature the higher is the conversion of ammonia to nitric oxide.

An object of this invention is the production of a catalyst capable of operating at high temperatures.

A further object of the invention is the production of a catalyst composed of an alloy capable of lowering the amount of loss of the catalyst at operating temperatures.

A still further object of the invention is to increase the amount of ammonia converted at any given temperature above that obtained with essentially pure platinum in ammonia oxidation, and in the oxidation of other gases including sulfur dioxide.

Other objects will appear as the description proceeds.

By incorporating larger amounts of other metals with platinum, I have discovered that it is possible to operate the catalyst at much higher temperatures than are practical with platinum, obtain equal or even less loss of catalyst at this higher temperature and, furthermore, obtain higher conversions than platinum will yield.

An alloy that I have found to be superior to platinum consists essentially of platinum and rhodium. The presence of rhodium in appreciable quantities, not only tends to lower the amounts of catalyst lost at operating temperatures, but also increases the amount of ammonia that is converted at any given temperature above that obtained with essentially pure platinum. This alloy may comprise as low as 2% and as high as 50% by weight of rhodium, or even higher. The higher percentages of rhodium have been found beneficial, but the hardness and brittleness of the alloy makes it unsuitable for working into catalytic form. It will be understood, of course, that this invention applies not only to alloys of platinum and rhodium but to an alloy of platinum with any other platinum metal or metals.

In some cases, particularly where the percentage of the metal alloyed with platinum is high, the alloy will be found to be too brittle for fabrication into the usual wire gauze form. In such cases the catalyst is preferably in the form of perforated plates.

In carrying out my invention, I prefer to use a gauze woven from wire .003 inch in diameter, having 80 meshes per inch, and consisting of four layers as close together as possible; preferably welded together provided the meshes are not destroyed. This gauze can be used as four flat layers as is the practice with the United Alkali Company's converter as described in J. Soc. Chem. Ind. 41–43 T (1922) or as a cylindrical gauze such as is used in the Parsons-Jones converter disclosed in U. S. Patent 1,321,376. The shape, form or design of the converter has no effect on the efficiency provided the gauze temperature can be maintained. In order to obtain efficiencies of 90% and above, it is necessary to preheat either the ammonia air mixture or preheat the air before the ammonia and air are mixed, or supply electrical or other heat from an outside source. With a 10% by volume ammonia air mixture and a conversion of 100%, the theoretical temperature rise of the catalyst, due to the heat of reaction, is approximately 720° C.; consequently, in order to obtain catalyst temperatures of approximately 1020° C., it would be necessary to supply, in the form of preheat, 300° C. so as to get the desired catalyst temperature. Practically, it is necessary to supply a little additional heat to compensate for losses.

The magnitude of conversion with either a platinum gauze or a platinum alloy gauze seems to depend on the catalyst temperature instead of the type of converter used. If the catalyst is maintained at the same temperature in two differently designed converters and the ammonia rating kept comparable, the conversions are usually identical.

In carrying out my process I may oxidize the ammonia at atmospheric pressure or I may operate the process at pressures substantially above atmospheric pressure. The latter process is described by Maxted in his British Patent 127,845. There is a great advantage in operating such a process above atmospheric pressure, because the volume of the apparatus is greatly reduced, due primarily to the increase in rate of oxidation of NO to $NO_2$ under increased pressure. In operating under increased pressure, it is necessary to use an ammonia-air mixture under 10% by volume, since such mixtures support combustion more readily under pressure.

I have also found that my process may be operated at decreased pressures, that is, pressures less than atmospheric, but I preferably operate at pressures in the range of 15 to 200 pounds.

The following example is given by way of illustration as one embodiment of my invention which is applicable to a platinum-rhodium gauze catalyst, but it is to be understood, of course, that the invention is not to be limited thereby.

Burning 100 pounds of ammonia per ounce of catalyst per twenty-four hours as a 9.5% by volume mixture, the conversions at approximately 1000° C. catalyst temperature with essentially pure platinum are approximately 6% higher at atmospheric pressure than when running under 100 pound gauge pressure. Under the same conditions, a catalyst containing approximately 90% platinum and 10% rhodium gives substantially higher conversions both at atmospheric and increased pressures. The loss of catalyst increases very rapidly as the temperature is increased above approximately 850° C., but when 90% platinum–10% rhodium gauze is used, the loss at operating temperature is approximately one-half that of essentially pure platinum. In operating I prefer to use temperatures of 850° C. to 1200° C.

A further advantage in the use of rhodium in this connection lies in the fact that since rhodium has a much lower density than platinum the use of platinum-rhodium alloy decreases the weight of the catalyst to be used without materially increasing the cost. Also, platinum-rhodium alloy has a somewhat higher melting point than platinum alone. Also, since rhodium has a lower rate of volatilization at increased temperatures, the rate of loss of the catalyst in the case of the platinum-rhodium alloy is less than in the case of pure platinum.

Although I have referred to the catalyst as being in the form of a wire gauze, it will be understood, of course, that the catalyst may take any other form of the type customarily employed in ammonia oxidation.

As many apparently widely different embodiments of this invention may be made without departing from the spirit thereof, it is to be understood that I do not intend to limit myself to the specific embodiments thereof except as indicated in the appended claims.

I claim:

1. A catalyst comprising a body of platinum alloyed with more than 2 per cent of rhodium, said body providing a multiplicity of contact elements, said elements being in spaced relation.

2. A catalyst comprising a body of platinum alloyed with 2 to 50 per cent of rhodium, said body providing a multiplicity of contact elements, said elements being in spaced relation.

3. A catalyst comprising a body of platinum alloyed with 5 to 25 per cent of rhodium, said body providing a multiplicity of contact elements, said elements being in spaced relation.

4. The invention of claim 1 in which the catalyst is wire gauze.

5. The invention of claim 2 in which the catalyst is wire gauze.

6. The invention of claim 3 in which the catalyst is wire gauze.

7. The invention of claim 1 in which the catalyst is a perforated plate.

8. The invention of claim 2 in which the catalyst is a perforated plate.

9. The invention of claim 3 in which the catalyst is a perforated plate.

In testimony whereof, I affix my signature.

CLARK W. DAVIS.